United States Patent
Lin et al.

(10) Patent No.: US 9,541,776 B2
(45) Date of Patent: Jan. 10, 2017

(54) OPTICAL ASSEMBLY FOR 90° POLARIZATION ROTATION

(71) Applicant: Lightel Technologies, Inc., Renton, WA (US)

(72) Inventors: Shyh-Chung Lin, Bellevue, WA (US); Hsin-Jung Lee, Newcastle, WA (US)

(73) Assignee: LIGHTEL TECHNOLOGIES, INC., Renton, WA (US)

(*) Notice: Subject to any disclaimer, the term of this patent is extended or adjusted under 35 U.S.C. 154(b) by 203 days.

(21) Appl. No.: 14/312,613

(22) Filed: Jun. 23, 2014

(65) Prior Publication Data

US 2015/0370096 A1    Dec. 24, 2015

(51) Int. Cl.
| | |
|---|---|
| G02B 5/30 | (2006.01) |
| G02F 1/09 | (2006.01) |
| G02F 1/095 | (2006.01) |
| G02B 27/28 | (2006.01) |
| G02B 6/27 | (2006.01) |
| G02B 27/00 | (2006.01) |
| G02B 5/04 | (2006.01) |

(52) U.S. Cl.
CPC .............. *G02F 1/09* (2013.01); *G02B 27/286* (2013.01); *G02F 1/095* (2013.01); *G02B 5/04* (2013.01); *G02B 6/2746* (2013.01); *G02B 6/2766* (2013.01); *G02B 27/0025* (2013.01); *G02B 27/283* (2013.01)

(58) Field of Classification Search
CPC ....... G02B 5/30; G02B 5/3025; G02B 6/2746; G02B 27/28; G02B 27/283; G02B 27/286; G02F 1/09; G02F 1/093

USPC .......... 359/483.01, 484.01, 484.02, 484.03, 359/484.04, 484.05, 484.06, 484.1, 489.01, 359/489.02, 489.08, 489.09; 372/703

See application file for complete search history.

(56) References Cited

U.S. PATENT DOCUMENTS

| | | | | |
|---|---|---|---|---|
| 5,568,309 A * | 10/1996 | Rockwell | ............... | H01S 3/2333 359/338 |
| 6,154,581 A * | 11/2000 | Lu | ............... | G02F 1/093 359/484.05 |
| 2015/0146291 A1* | 5/2015 | Mao | ............... | G02F 1/0136 359/484.02 |
| 2015/0370097 A1* | 12/2015 | Lin | ............... | G02F 1/09 359/484.02 |
| 2016/0282641 A1* | 9/2016 | Chen | ............... | G02F 1/0955 |

* cited by examiner

*Primary Examiner* — Arnel C Lavarias
(74) *Attorney, Agent, or Firm* — Han IP Corporation

(57) ABSTRACT

An optical assembly maintains 90° polarization rotation. In one aspect, an optical assembly includes a polarization beam splitter a rotational element and a path exchange mirror. The temperature, wavelength and manufacturing dependencies of polarization rotation of this optical assembly are minimal to nonexistent compared to conventional Faraday rotation assemblies as the optical fiber accepts only the desired rotation. As such these optical assemblies have no temperature and wavelength dependencies of the polarization rotation angle over broad temperature and wavelength ranges with minimal additional losses.

12 Claims, 7 Drawing Sheets a) Forward propagation. b) Reverse propagation.

a) Forward propagation. b) Reverse propagation.

a) Forward propagation. b) Reverse propagation.

a) Forward propagation. b) Reverse propagation.

a) Forward propagation. b) Reverse propagation.

a) Forward propagation. b) Reverse propagation.

a) Forward propagation. b) Reverse propagation.

OPTICAL ASSEMBLY FOR 90° POLARIZATION ROTATION

TECHNICAL FIELD

The present disclosure relates to an optical assembly for use in polarization rotation applications and, more particularly, to an optical assembly with minimal to no manufacturing variation in polarization rotation angle and minimal to no temperature and wavelength dependencies of the polarization rotation angle.

BACKGROUND

Polarization rotation devices have been used for various purposes in optical systems, especially in fiber optic communication, optical image processing, and sensor applications particularly with the use of phase conjugate mirrors. The capability of these devices is demonstrated in FIG. 1. A phase conjugate mirror is desirable in fiber optical systems as a result of the signal distortion caused by fiber birefringence. Phase conjugation, by interchanging the bases of the incident beam polarization, allows a signal to return through a system and experience the reverse distortion as opposed to additional distortion. Faraday rotation, or the Faraday Effect, is one known method for creating a phase conjugation mirror. The Faraday Effect allows for the realization of devices such as fiber optic isolators, circulators, and Faraday rotating mirrors.

The Faraday rotation is determined by the following expression: $\theta = VBL$, where $\theta$ is the angle of polarization rotation after a single pass through the rotator, V is the Verdet constant, B is the applied or internal magnetic field strength and L is the length of the rotator. The Verdet constant is a property inherent to a particular material and is highly dependent on both temperature and wavelength. This limits the use of systems employing Faraday rotation over broad temperature and wavelength ranges. In most applications the rotator is used in the magnetic saturation region so as to avoid variations due to the magnetic field. The length also presents precision rotation problems, as it cannot be exactly controlled under manufacturing conditions. With the use of thin film techniques and growth methods, the variations are slight but still present.

The manufacturing tolerance as well as temperature and wavelength-dependent nature of conventional single crystals for polarization rotation limit the use of optical crystal devices in precision instruments as well as over broad temperature and wavelength ranges. These conventional means only provide the desired polarization rotation at a single wavelength and at a certain temperature, with that temperature and wavelength being dependent upon the manufacturing accuracy. Advances in optical communication, sensors, and image processing require broadband, multi-wavelength capacities such as WDM, CWDM, DWDM, in central offices and uncontrolled field environment. Therefore, there remains a need to develop optical assemblies with precise polarization rotation independent of other variables.

SUMMARY

In one aspect, an optical assembly may include a polarization beam splitter, a Faraday rotating crystal and a path exchange mirror. The orientation of these optical elements will be such that the return light that re-enters the fiber optic will have undergone a polarization rotation of exactly 90°. Any return light incident on the plane of the fiber optic that has not undergone a 90° rotation will be scattered, thus insuring the precision of the polarization rotation.

In some embodiments, the polarization beam splitter may include a beam displacing crystal.

In some embodiments, the polarization beam splitter may include a birefringent crystal wedge.

In some embodiments, the polarization beam splitter may include a reflective polarizer.

In some embodiments, the polarization beam splitter may include a Glan-Thompson polarizer.

In some embodiments, the Faraday rotating element may include a thin film garnet.

In some embodiments, the Faraday rotating element may include a bismuth doped yttrium iron garnet.

In some embodiments, the Faraday rotating element may include an yttrium iron garnet.

In some embodiments, the Faraday rotating element may include a rare earth doped yttrium iron garnet.

In some embodiments, the Faraday rotating element may produce a nominally 90° polarization rotation through one pass.

In some embodiments, the path exchange mirror may include a 90° corner prism.

In some embodiments, the path exchange mirror may include a corner prism at an angle of 90°-$\beta$, where 2$\beta$ is the angle of separation of the two paths.

In some embodiments, the path exchange mirror may include a 90° corner thin film coated prism.

In some embodiments, the path exchange mirror may include a corner thin film coated prism at an angle of 90°-$\beta$.

In some embodiments, the polarization beam splitter may include a polarization beam splitter with a polarization maintaining (PM) fiber at both outputs thereof and a non-PM fiber at an input thereof. Moreover, the Faraday rotating crystal may include a Faraday Rotator with a nominal rotation of 90° with PM fibers on both sides thereof to serve as a beam exchanger.

In one aspect, a phase conjugate mirror comprising the optical assembly of the present disclosure is provided.

Detailed description of various embodiments are provided below, with reference to the attached figures, to promote better understanding of the characteristics and benefits of the various embodiments of the present disclosure.

DETAILED DESCRIPTION OF PREFERRED EMBODIMENTS

The present disclosure describes an optical assembly that has minimal to no variation of the polarization rotation angle over broad temperature and wavelength ranges for any given manufacturing tolerances. This may be realized by the utilization of 1) a polarization beam splitter 2) a Faraday rotation crystal and 3) a path exchange mirror.

The above listed constituents work together in the following manner. The polarization beam splitter creates two paths with orthogonally oriented polarizations. One or both of these paths are incident upon a Faraday rotating crystal with a set internal or external magnetic field. Both paths then are incident upon the path exchange mirror which in one embodiment is a corner mirror. The now reversed paths are again incident on the Faraday rotating crystal. Again incident upon the polarization beam splitter, only the portion of the beam that is orthogonal to its initial state will propagate through the beam splitter in a way to be incident upon and propagate down the fiber. As such for any given amount of rotation accuracy the returned beam will be exactly perpendicular to its incoming state.

Embodiment 1

Figure 1:
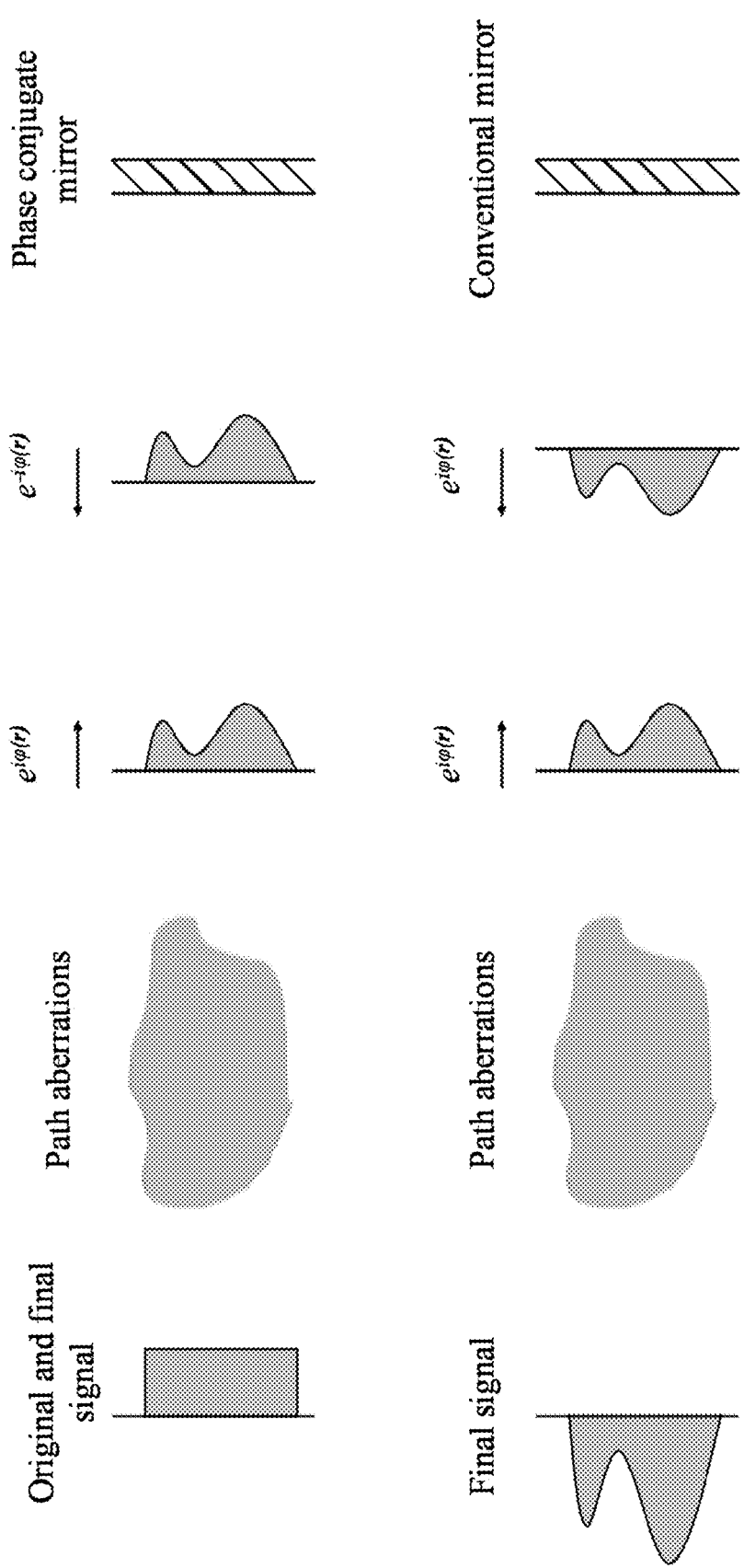
FIG. 1 is a diagram of a phase conjugate mirror and a comparable conventional mirror.
Figure 2:
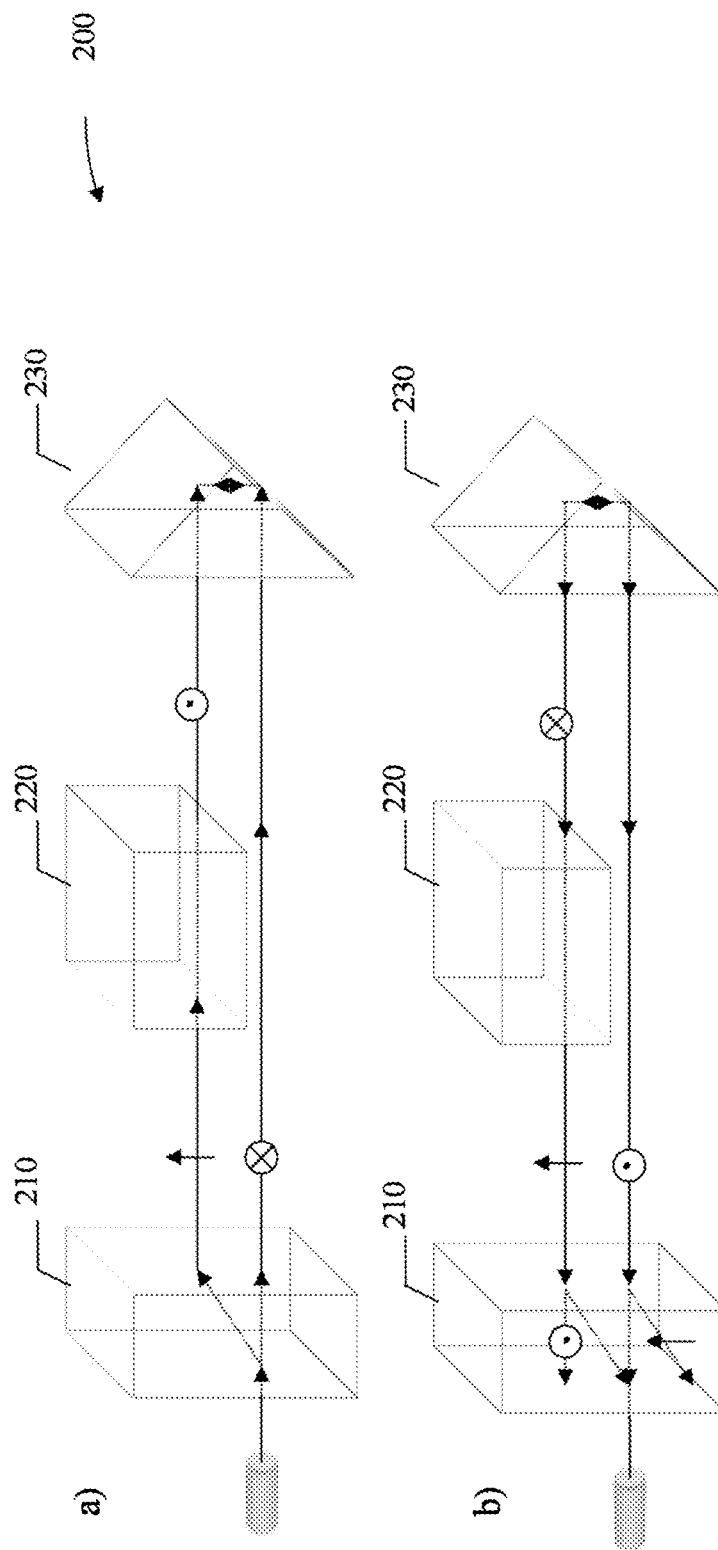
FIG. 2 is a diagram showing polarization rotation when light propagates through an optical assembly in accordance with one embodiment of the present disclosure.

In Embodiment 1, an optical assembly includes a linear layout and parallel propagation of the two orthogonal beam paths. Referring to FIG. 2, the optical assembly 200 includes a first crystal 210 a second crystal 220 and a third prism 230. In some embodiments, the optical assembly 200 may further include an optical waveguide. Crystal 220 is encompassed by an external magnet (not shown) having a magnetic field B axially aligned in a direction of propagation of light, or alternatively has a permanent internal magnetic field. A beam of light incident on the first crystal 210 is split into its constituent polarizations with displaced parallel paths. One of these beams is then incident upon crystal 220 and the polarization is rotated by 90° due to the Faraday Effect. These beams are both then incident upon the 90° prism and by total internal reflection the beam paths are exchanged. The first crystal 210 may be any highly birefringent parallel crystal. The second crystal 220 may be any Faraday rotating garnet. Examples of the second crystal 220 include a bulk of single crystal of yttrium iron garnet (YIG), or a thin film bismuth doped iron garnet. The third prism 230 may be any crystal with sufficient index for total internal reflection at the incident angle. Examples of the third prism 230 include a quartz prism. The return path is similar and the beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 2

Figure 3:
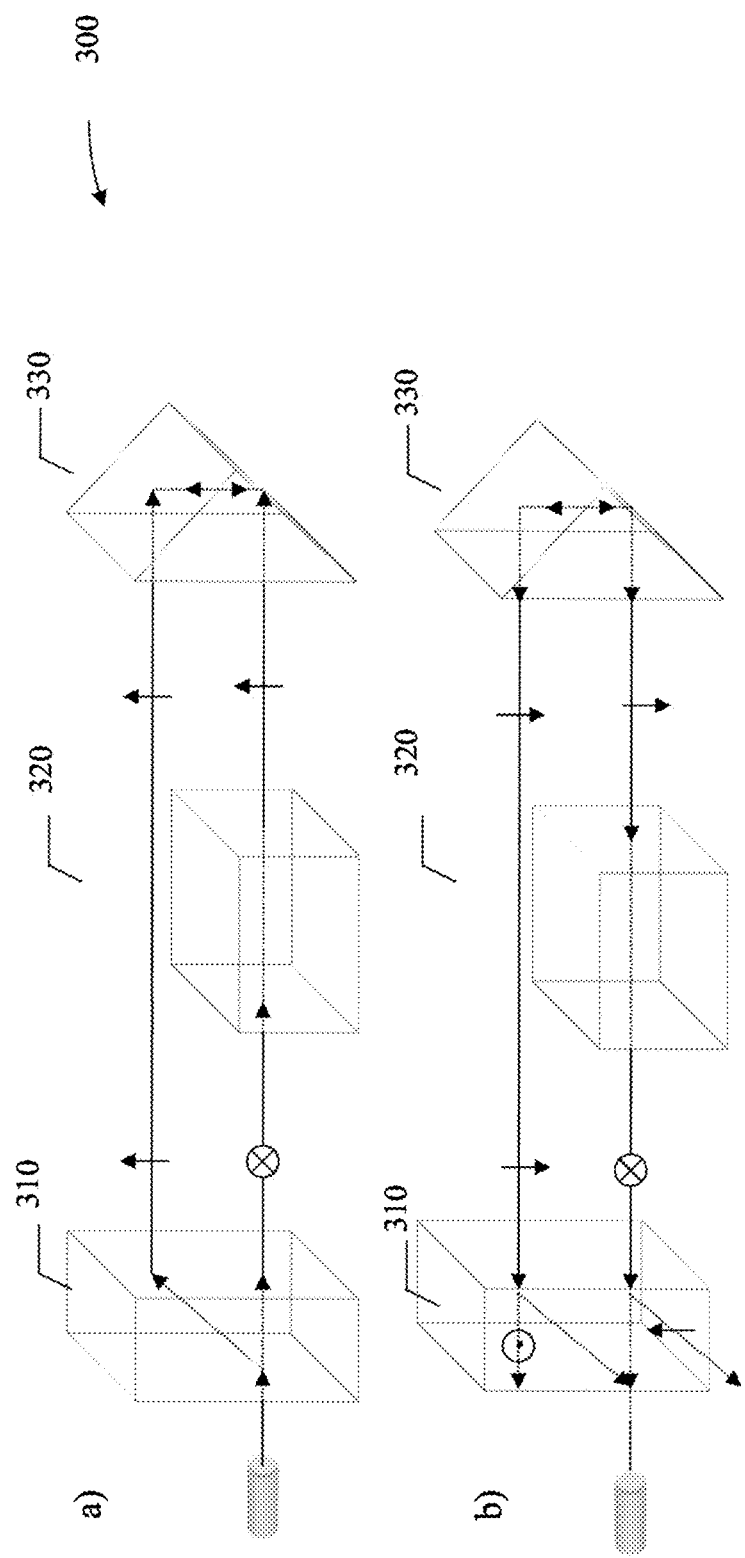
FIG. 3 is a diagram showing polarization rotation when light propagates through an optical assembly in accordance with another embodiment of the present disclosure.

Embodiment 2 differs from embodiment 1 in the placement of the Faraday rotating crystal. Referring to FIG. 3, the optical assembly 300 includes a first crystal 310 a second crystal 320 and a third prism 330. In some embodiments, the optical assembly 300 may further include an optical waveguide. Crystal 320 is positioned such that only one path is incident upon it. Crystal 320 is encompassed by an external magnet (not shown) having a magnetic field B axially aligned in a direction of propagation of light, or alternatively has a permanent internal magnetic field. A beam of light incident on the first crystal 310 is split into its constituent polarizations with displaced parallel paths. One of these beams is then incident on the second crystal 320 and is rotated 90° due to the Faraday Effect. These beams are both then incident upon the 90° prism and by total internal reflection the beam paths are exchanged. The first crystal 310 may be any highly birefringent parallel crystal. The second crystal 320 may be any Faraday rotating garnet. Examples of the second crystal 320 include a bulk of single crystal of yttrium iron garnet (YIG), or a thin film bismuth doped iron garnet. The third prism 330 may be any optically transparent material. Examples of the third prism 330 include a quartz prism. The return path is similar and the beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 3

Figure 4:
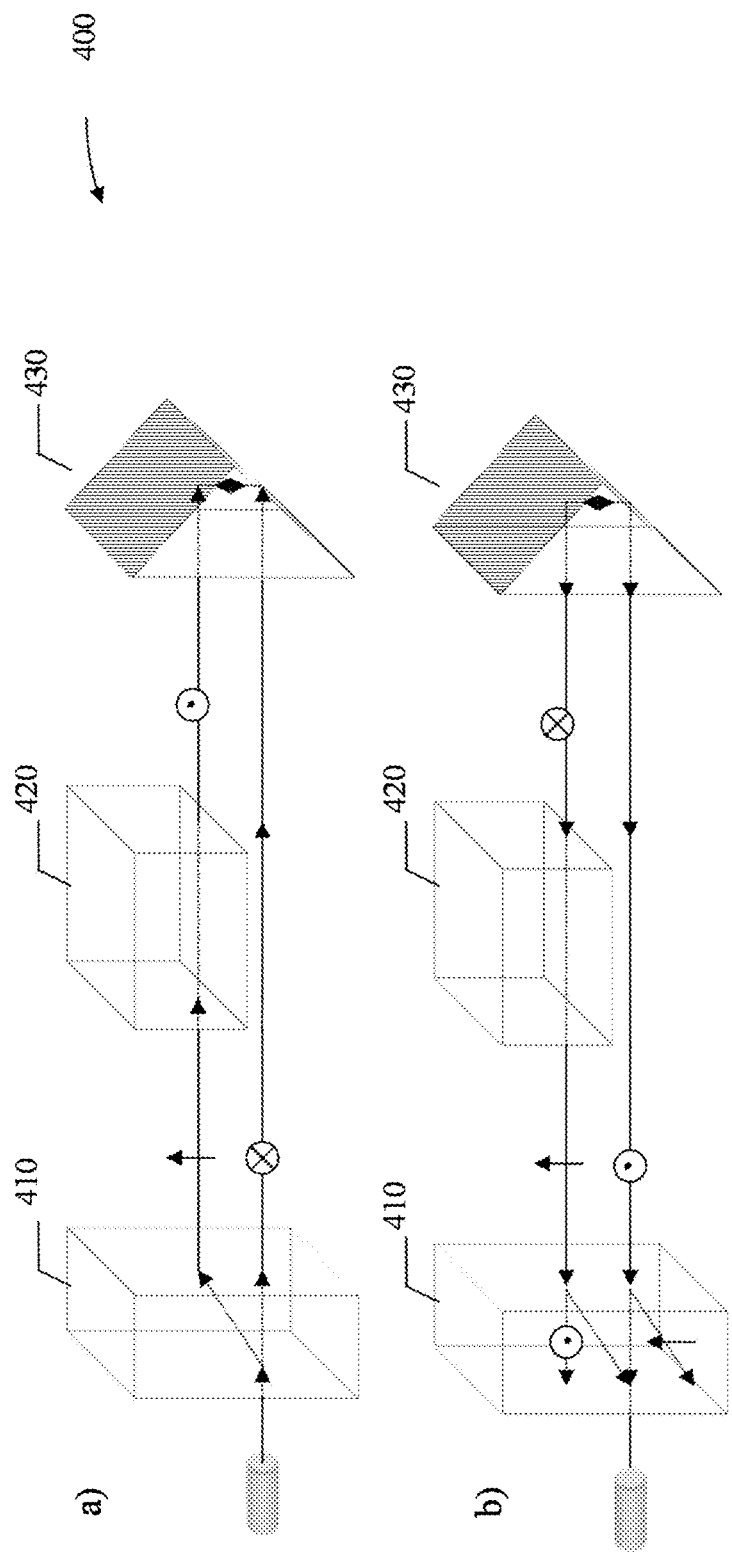
FIG. 4 is a diagram showing polarization rotation when light propagates through an optical assembly in accordance with another embodiment of the present disclosure.

Embodiment 3 differs from Embodiment 1 in the addition of a thin film reflecting coating to the path exchange mirror. Referring to FIG. 4, the optical assembly 400 includes a first crystal 410 a second crystal 420 and a third prism 430 with a thin film metallic coating. In some embodiments, the optical assembly 400 may further include an optical waveguide. Crystal 420 is positioned such that only one path is incident upon it. Crystal 420 is encompassed by an external magnet (not shown) having a magnetic field B axially aligned in a direction of propagation of light, or alternatively has a permanent internal magnetic field. A beam of light incident on the first crystal 410 is split into its constituent polarizations with displaced parallel paths. One of these beams is then incident on the second crystal 420 and is rotated 90° due to the Faraday Effect. These beams are both then incident upon the 90° prism and by reflection from a metallic surface the beam paths are exchanged. The first crystal 410 may be any highly birefringent parallel crystal. The second crystal 420 may be any Faraday rotating garnet. Examples of the second crystal 420 include a bulk of single crystal of yttrium iron garnet (YIG), or a thin film bismuth doped iron garnet. The third prism 430 may be any optically transparent crystal with a metallic coating. Examples of the third prism 430 include a quartz prism with a thin film gold coating. The return path is similar and the beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 4

Figure 5:
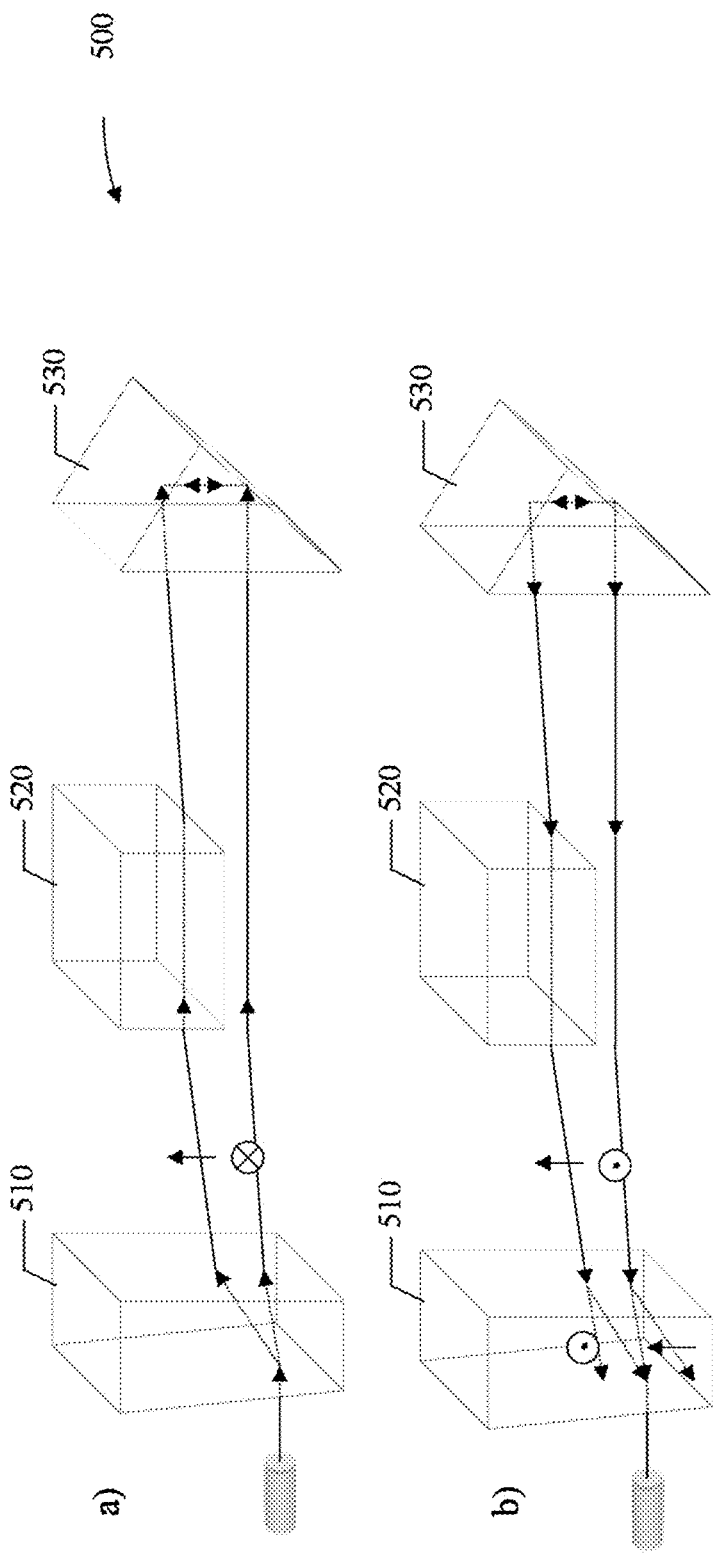
FIG. 5 is a diagram showing polarization rotation when light propagates through an optical assembly in accordance with yet another embodiment of the present disclosure.

Embodiment 4 differs from Embodiment 3 in that the first crystal is not a parallelepiped, but rather a birefringent wedge, creating non-parallel paths with an angle separation of 2β and requiring the third prism to be of an angle 90°-β. Referring to FIG. 5, an optical assembly 500 includes a first crystal 510, which is a birefringent wedge, a second crystal 520, which is a Faraday rotator with a nominal rotation of 90°, and a third prism 530 which is an angle of 90°-β. In some embodiments, the optical assembly 500 may further include an optical waveguide. The second crystal 520 is encompassed within an external magnet (not shown) having a magnetic field B axially aligned in a direction of propagation of light, or alternatively has an internal permanent magnetic field of similar alignment. A beam of light incident on the first crystal 510 is split into its constituent polarizations with displaced nonparallel paths. One of these beams is then incident on the second crystal 520 and is rotated 90° due to the Faraday Effect. These beams are then incident upon the prism and by metallic reflection the beam paths are exchanged. The first crystal 510 may be any highly birefringent wedge crystal. The second crystal 520 may be any Faraday rotating garnet. Examples of the second crystal 520 include a bulk of single crystal of yttrium iron garnet (YIG), or a thin film bismuth doped iron garnet. The third prism 530 may be any crystal with a metallic thing film coating. Examples of the third prism 530 include a gold thin film on a quartz prism. The return path is similar and the beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 5

Figure 6:
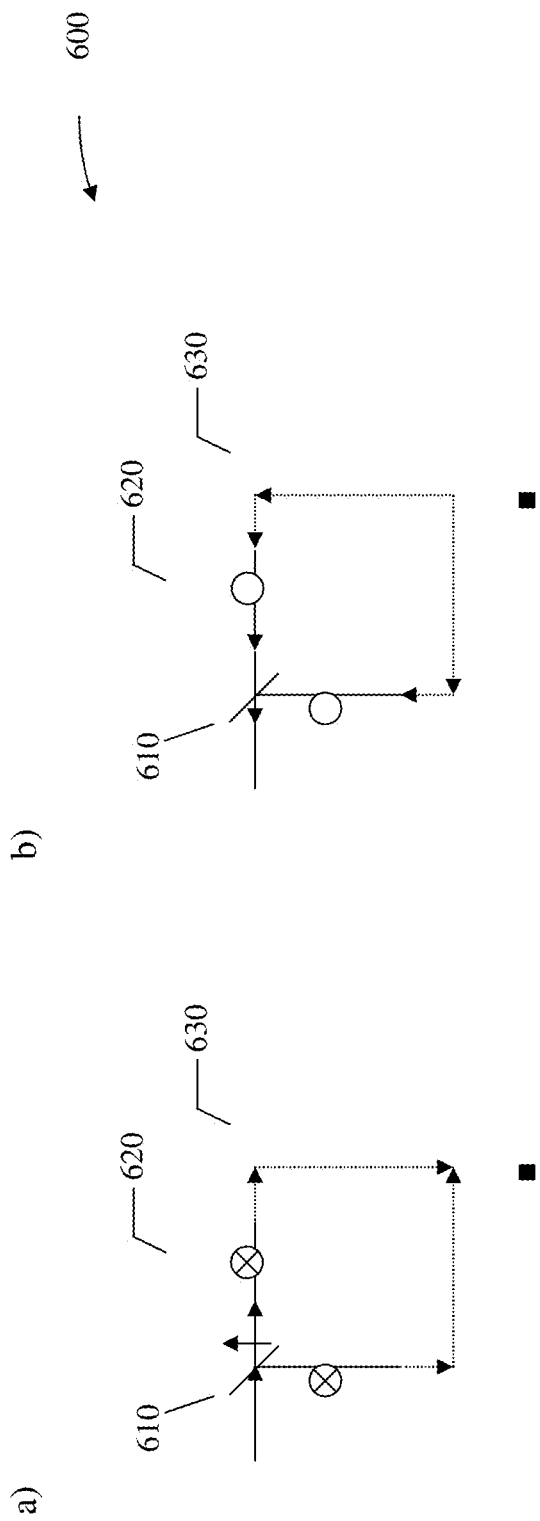
FIG. 6 is a diagram showing polarization rotation when light propagates through an optical assembly in accordance with yet another embodiment of the present disclosure.

In Embodiment 5 an optical assembly includes a nonlinear layout and perpendicularly propagating beams. Referring to FIG. 6, an optical assembly 600 includes a first crystal 610, which is a reflective linear polarizer, a second crystal 620, which is a Faraday rotator with a nominal rotation of 90°, and a third crystal 630 which is a rectangular thin film coated reflector. In some embodiments, the optical assembly 600 may further include an optical waveguide. The second crystal 620 is encompassed within an external magnet (not shown) having a magnetic field B axially aligned in a direction of propagation of light, or alternatively has an internal permanent magnetic field of similar alignment. A beam of light incident on the first crystal 610 is split into its constituent polarizations with perpendicular propagation paths. One beam is then incident on the second crystal 620 and has a polarization rotation of 90° due to the Faraday Effect. These beams are then incident upon the prism and by metallic reflection the beam paths are exchanged. The first crystal 610 may be any polarization splitting crystal. The second crystal 620 may be any Faraday rotating garnet. Examples of the second crystal 620 include a bulk of single crystal of yttrium iron garnet (YIG), or a thin film bismuth doped iron garnet. The third crystal 630 may be any crystal with a thin film metallic coating. Examples of the third crystal 630 include a quartz cube with a gold thin film. The return path is similar and the beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 6

Figure 7:
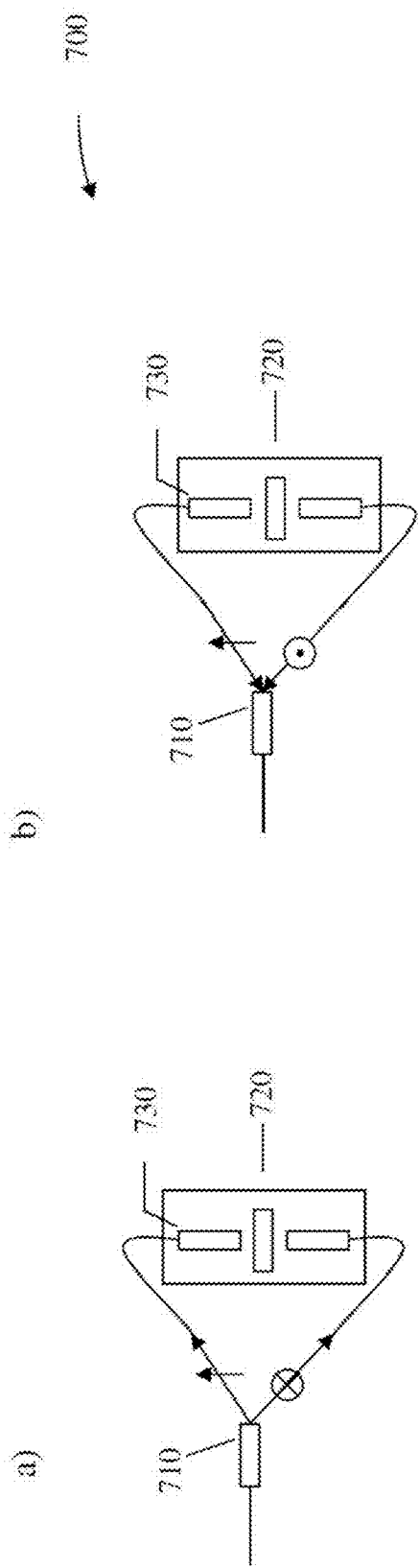
FIG. 7 is a diagram showing polarization rotation when light propagates through an optical assembly in accordance with yet another embodiment of the present disclosure.

In Embodiment 6 an optical assembly includes a nonlinear layout and fiber integration. Referring to FIG. 7, an optical assembly 700 includes a first element 710, which is a polarization beam splitter with a polarization maintaining (PM) fiber at both outputs thereof and a non-PM fiber at the input thereof, a second crystal 720, which is a Faraday rotator with a nominal rotation of 90° with PM fibers on both sides thereof to serve as a beam exchanger, and a third path exchange fiber 730 which is a PM fiber with collimators on both ends. In some embodiments, the optical assembly 700 may further include an optical waveguide. The second crystal 720 is encompassed within an external magnet (not shown) having a magnetic field B axially aligned in a direction of propagation of light, or alternatively has an internal permanent magnetic field of similar alignment. A beam of light incident on the first element 710 is split into its constituent polarizations with propagation paths along the two output fibers. The two beams propagate the path exchange fiber 730 and are incident upon the second crystal 720 and undergo polarization rotation of 90° due to the Faraday Effect. The first crystal 710 may be any in-line polarization splitting device. The second crystal 720 may be any Faraday rotating garnet. Examples of the second crystal 720 include a bulk of single crystal of yttrium iron garnet (YIG), or a thin film bismuth doped iron garnet. The third path exchange fiber 730 may be any length of PM fiber with any method of collimation at the fiber end. Examples of the collimators include convex lenses aligned to the pigtail. The return path is similar and the beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

These embodiments may be used together, individually or with Polarization Splitting/Combining elements, Polarization Rotation elements, and Path Exchanging elements interchanged to create a phase conjugate mirror employing Faraday rotation. These assemblies allow a precise value of polarization rotation across wider wavelength and temperature ranges as well as an independence of manufacturing capabilities.

What is claimed is:
1. An optical assembly, comprising:
a polarization beam splitter wedge;
a Faraday rotating crystal; and
a path exchange mirror,
wherein the polarization beam splitter wedge, the Faraday rotating crystal and the path exchange mirror are arranged such that, as an incoming collimated optical beam passes through the polarization beam splitter wedge, the optical beam emerges as two non-parallel orthogonally polarized output beams, such that:
one of the two orthogonally polarized output beams traverses through the optical assembly in a first sequential order as follows: the polarization beam splitter wedge, the Faraday rotating crystal, the path exchange mirror, and the polarization beam splitter wedge, and
another of the two orthogonally polarized output beams traverses through the optical assembly in a second sequential order as follows: the polarization beam splitter wedge, the path exchange mirror, the Faraday rotating crystal, and the polarization beam splitter wedge, and wherein, as the two orthogonally polarized output beams pass through the polarization beam splitter wedge in opposite directions, 90° polarization rotated components of the two orthogonally polarized output beams recombine and emerge as one beam in a reverse direction with respect to the incoming collimated optical beam, with polarization rotated 90° relative to a polarization of the incoming collimated optical beam while non-rotated components of the two orthogonally polarized output beams emerge at an angle relative to the incoming collimated optical beam and are scattered and subsequently isolated.

2. The optical assembly of claim 1, wherein the polarization beam splitter comprises a highly birefringent parallel crystal.

3. The optical assembly of claim 2, wherein the path exchange mirror comprises a 90° prism.

4. The optical assembly of claim 2, wherein the path exchange mirror comprises a 90° metal thin film coated prism.

5. The optical assembly of claim 1, wherein the polarization beam splitter wedge comprises a highly birefringent wedge crystal with two polarized beams emerging from the birefringent wedge crystal at an angle of 2β relative to each other, wherein 2β is a branching angle between two beams.

6. The optical assembly of claim 5, wherein the path exchange mirror comprises a prism of an angle of 90°-β.

7. The optical assembly of claim 5, wherein the path exchange mirror comprises a metal thin film coated prism of an angle of 90°-β.

8. The optical assembly of claim 1, wherein the path exchange mirror comprises a square crystal with a thin film metallic coating.

9. The optical assembly of claim 8, wherein the polarization beam splitter comprises a reflective linear polarizer.

10. The optical assembly of claim 8, wherein the polarization beam splitter comprises a Glan-Thompson polarizing cube.

11. The optical assembly of claim 1, wherein the polarization beam splitter comprises a polarization beam splitter with a polarization maintaining (PM) fiber at both outputs thereof and a non-PM fiber at an input thereof, and wherein the Faraday rotating crystal comprises a Faraday Rotator with a nominal rotation of 90° with PM fibers on both sides thereof to serve as a beam exchanger.

12. A phase conjugate mirror, comprising:
an optical assembly that comprises:
a polarization beam splitter wedge;
a Faraday rotating crystal; and
a path exchange mirror,
wherein the polarization beam splitter wedge, the Faraday rotating crystal and the path exchange mirror are arranged such that, as an incoming collimated optical beam passes through the polarization beam splitter wedge, the optical beam emerges as two non-parallel orthogonally polarized output beams, such that:
one of the two orthogonally polarized output beams traverses through the optical assembly in a first sequential order as follows: the polarization beam splitter wedge, the Faraday rotating crystal, the path exchange mirror, and the polarization beam splitter wedge, and
another of the two orthogonally polarized output beams traverses through the optical assembly in a second sequential order as follows: the polarization beam splitter wedge, the path exchange mirror, the Faraday rotating crystal, and the polarization beam splitter wedge, and
wherein, as the two orthogonally polarized output beams pass through the polarization beam splitter wedge in opposite directions, 90° polarization rotated components of the two orthogonally polarized output beams recombine and emerge as one beam in a reverse direction with respect to the incoming collimated optical beam, with polarization rotated 90° relative to a polarization of the incoming collimated optical beam while non-rotated components of the two orthogonally polarized output beams emerge at an angle relative to the incoming collimated optical beam and are scattered and subsequently isolated.

* * * * *